Dec. 29, 1942.  H. J. MURPHY  2,307,003
SWITCH
Original Filed March 11, 1939    3 Sheets-Sheet 1
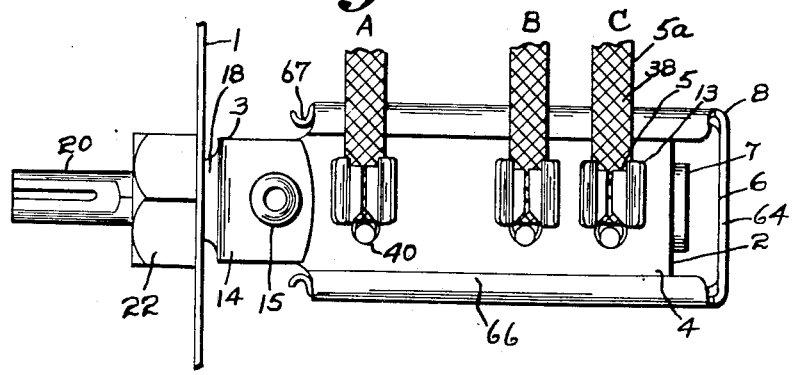
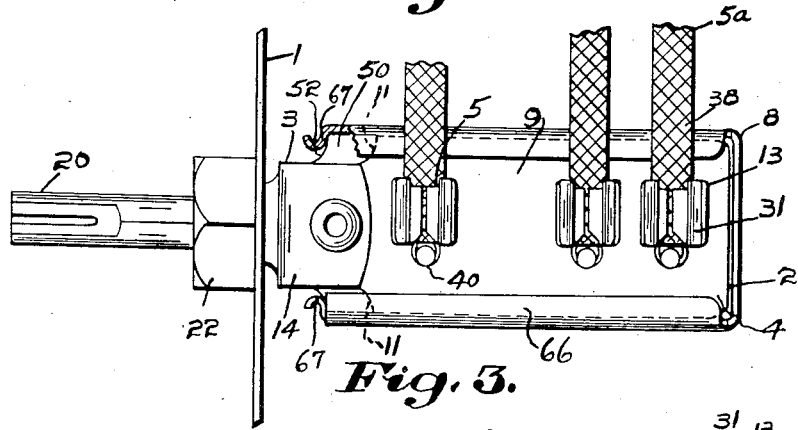
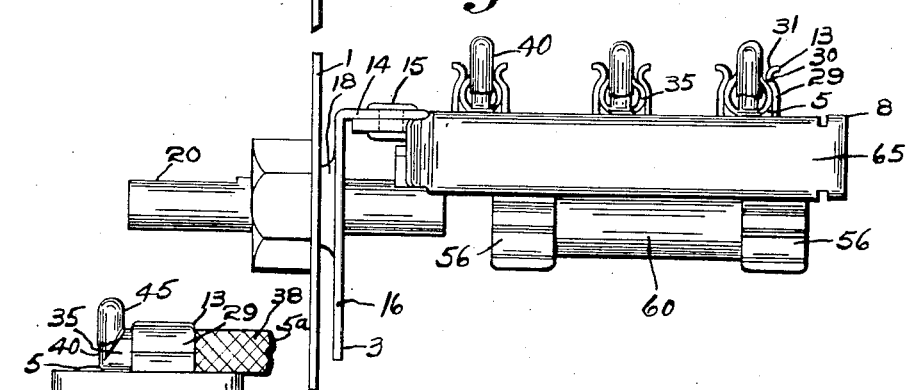
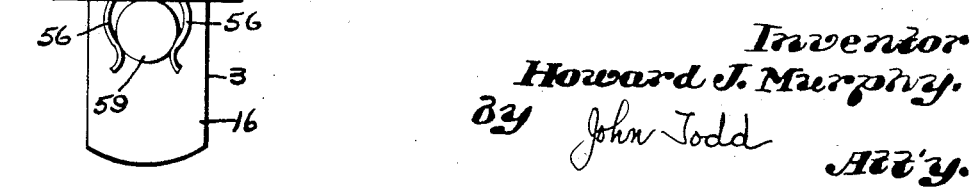
Inventor
Howard J. Murphy.
By John Todd
Att'y.

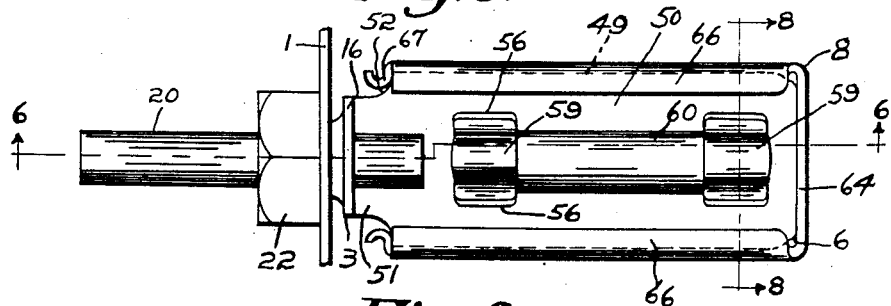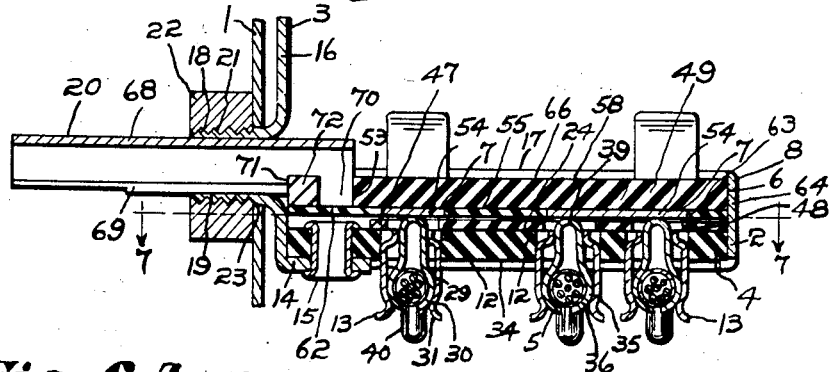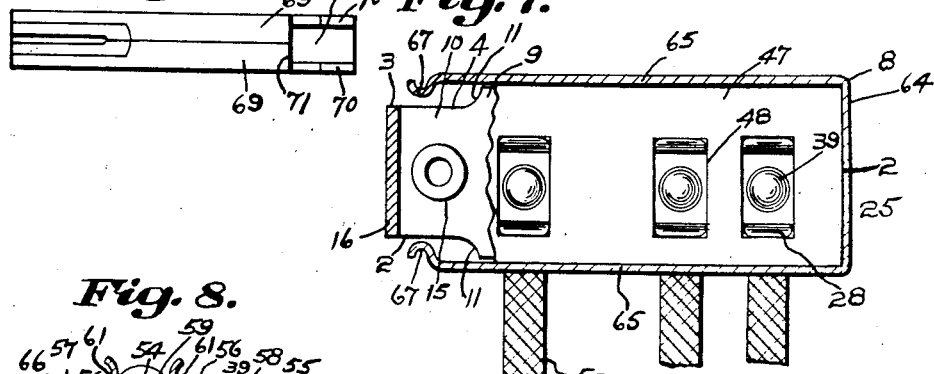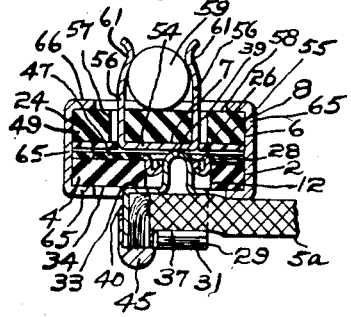

Dec. 29, 1942. H. J. MURPHY 2,307,003
SWITCH
Original Filed March 11, 1939 3 Sheets-Sheet 3
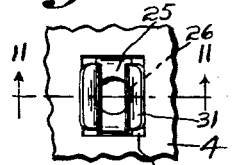
Fig. 9.
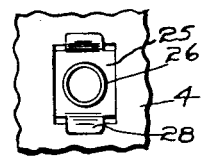
Fig. 10.
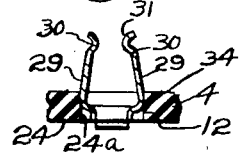
Fig. 11.
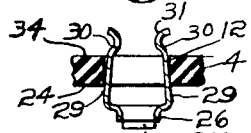
Fig. 12.
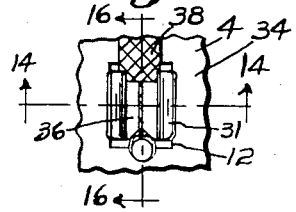
Fig. 13.
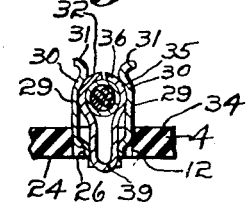
Fig. 14.
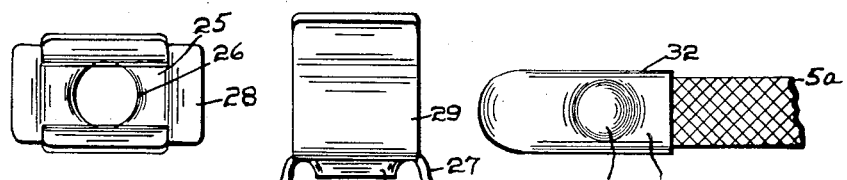
Fig. 15. Fig. 21. Fig. 16.
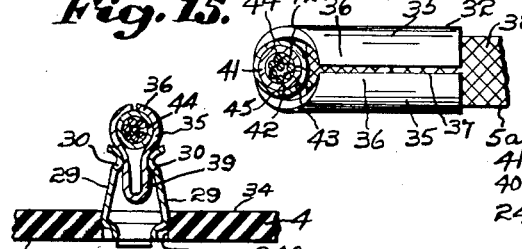
Fig. 17. Fig. 18. Fig. 19.
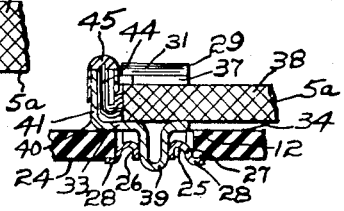
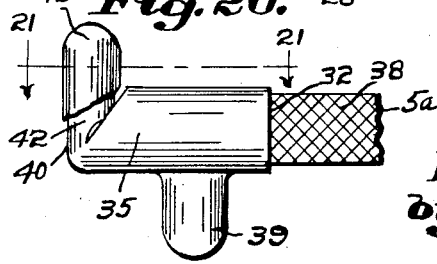
Fig. 20.
Inventor:
Howard J. Murphy
by John Todd
Att'y Patented Dec. 29, 1942

2,307,003

UNITED STATES PATENT OFFICE 2,307,003

SWITCH

Howard J. Murphy, Greenwood, Mass., assignor to United-Carr Fastener Corporation, Cambridge, Mass., a corporation of Massachusetts Original application March 11, 1939, Serial No. 261,382. Divided and this application September 5, 1941, Serial No. 409,636

3 Claims. (Cl. 200—16)

This invention relates to improvements in switches and more particularly to push-and-pull operative switches of the type used on automobiles and the like for turning on and off auxiliary lights.

This application is a divisional of my co-pending application Serial No. 261,382, filed March 11, 1939, now Patent No. 2,279,905.

The main object of this invention is an improved switch comprising parts of simple construction capable of being assembled together almost entirely by hand.

Other objects and uses of my invention will be apparent from inspection of the drawings and specification hereinbelow set forth.

Referring to the drawings, in which I have illustrated preferred embodiments of my invention:

Fig. 1 is a top plan view of my improved switch device secured to a supporting part with the switch shown in "off" position;

Fig. 2 is a view similar to that of Fig. 1 with the switch in "on" position;

Fig. 3 is a front plan view of the installation shown in Figs. 1 and 2 with the switch in "off" position;

Fig. 4 is an end view of the switch device shown in the installation of Fig. 3 looking from the right of the switch;

Fig. 5 is a bottom view of the installation shown in Figs. 1–3 with the switch in "on" position;

Fig. 6 is a sectional view taken along the line 6—6 of Fig. 5 with a portion of the outer insulating plate cut away showing the shape of the inner insulating plate;

Fig. 6ª is a top plan view of the operating shaft forming a part of my switch device;

Fig. 7 is a section taken along the line 7—7 of Fig. 6;

Fig. 8 is a sectional view taken along the line 8—8 of Fig. 5;

Fig. 9 is a top view showing a preferred way of integrally assembling my improved attaching member with a supporting panel;

Fig. 10 is a bottom view of the installation shown in Fig. 9;

Fig. 11 is a section taken along the line 11—11 of Fig. 9;

Fig. 12 is a view similar to that of Fig. 11 showing the manner in which my attaching member is initially assembled with a support;

Fig. 13 is a top plan view of an installation comprising a support and a wire terminal attached to the support by means of my improved attaching member;

Fig. 14 is a sectional view taken along the line 14—14 of Fig. 13;

Fig. 15 is a section similar to that of Fig. 14 showing the manner in which a wire terminal is secured to a supporting panel by means of my attaching member;

Fig. 16 is a sectional view taken along the line 16—16 of Fig. 13;

Fig. 17 is a top plan view of my improved attaching member per se;

Fig. 18 is a side view of the attaching member shown in Fig. 17;

Fig. 19 is a bottom view of my improved wire terminal per se;

Fig. 20 is a side view of the wire terminal shown in Fig. 19; and

Fig. 21 is a sectional view of my improved wire terminal per se taken along the line 21—21 of Fig. 20.

Referring in detail to the construction of my improved switch as set out in the various figures, I have shown a switch secured to a supporting panel 1, which may be the dash of an automobile. The switch comprises a stationary part 2 affixed in immovable relation to the support 1 by means of an attaching or threaded member 3. The stationary part 2 has a supporting panel or plate 4 of insulating material carrying, in my preferred form, three wire terminals 5 to which are secured the leads or wire conductors 5ª. The lead A (Fig. 1) may run from the battery and the leads B and C (Fig. 1) to a fog light and tail light respectively of an automobile. A contact carrier part 6 (Fig. 6) is mounted opposite the stationary part 2 for reciprocable movement relative thereto and carries contacts 7 (Figs. 6 and 7) for electrical engagement with the terminals 5 of the stationary part to turn the switch on and off by said reciprocable movement, as will be understood by those skilled in the art. The stationary part and contact carrier part are maintained in operative relation by a fastener member 8 which, in my preferred form, is detachably assembled with the carrier part 6.

Referring in detail to the stationary part 1, the insulating plate 4 has a rectangular part 9 and a reduced portion 10 at one end forming shoulders 11—11 adjacent the junction of the portions 9 and 10, as most clearly shown in Fig. 7. The rectangular portion 9 of the plate 4 has, in my preferred form, three rectangular openings 12 (Fig. 6) adapted to receive attaching members 13, which, in turn, provide means for detachably securing the terminals 5 to the plate 4 in operative position relative to the contacts 7 of the contact carrier part 6. The stationary part 2 is rigidly secured to the support 1 through means of the threaded member 3 which comprises a base portion having a flange portion 14 secured to the reduced portion 10 of the insulating plate 4, as by means of the rivet 15 (Fig. 6). An angularly-bent portion 16 extends from the flange portion 14 beyond the lower face 17 of the contact carrier part (Fig. 6). A hollow shank 18, which is preferably pressed from the portion 16, extends therefrom in substantially right-angular relation in a direction away from the switch device. The shank portion 18 is open at both ends providing a bearing 19 for receiving and supporting an operating shaft 20 projecting from the contact carrier part 6. The shank is preferably externally threaded as at 21 for threaded engagement with the nut 22, as most clearly shown in Fig. 6. Thus the stationary part 2 is secured to the support 1 through inserting the threaded shank 18 through an aperture 23 (Fig. 6) of the support, after which the nut member 22 is engaged therewith.

The attaching members 13, illustrated most clearly in Figs. 17 and 18, are preferably formed from one piece of sheet metal and are adapted to be assembled initially with the insulating panel 4. Rigid attachment of my preferred form of attaching member to the panel is not effected until the wire terminals are assembled therewith, as will be described. The attaching members have means for receiving the terminals 5 and cooperate with the terminals 5 in a way to enable the last-mentioned parts to be rigidly affixed to the panel. My preferred form of attaching member comprises a substantially rectangular base portion 25 having an extruded opening 26. Legs 27, integral with opposed ends of the base 25, extend downwardly out of the plane of the base and have support-engaging means 28 at their free ends extending outwardly relative to each other. Spaced spring arms 29 extend from the base portion 25 in an opposite direction to that taken by the legs 27. The arms 29—29 have portions 30—30 converging away from the base portion 25 forming shoulders for engaging the wire terminal 5 and diverging portions 31—31 adjacent their free ends forming a lead permitting easy entrance of the terminal 5 between the arms.

Referring in detail to the construction of the wire terminals 5, as most clearly shown in Figs. 19—21, they are broadly similar in form to the wire terminals described in connection with my United States co-pending application Serial No. 215,795, filed June 25, 1938, but embody certain improvements thereover. Each of the terminals 5 is made of one piece of sheet metal and includes a body portion 32 having a base portion 33 (Fig. 16) adapted to be disposed in relatively close spaced relation to the outer surface 34 of the insulating panel 4 when the parts of the switch are in final working assembly (Fig. 8). Spaced side portions 35—35 (Fig. 21) extend upwardly from opposed edges of the base portion 33 and have portions 36—36 adjacent their free edges 37 extending inwardly toward each other forming a substantially cylindrical portion for receiving the insulating cover 38 of the wire conductor 5a. The cylindrical portion is formed of a predetermined size and shape to cooperate effectively with the spring arms 29—29 of the attaching member, as hereinbelow described. A contact portion 39, preferably in the form of a bump pressed from the base portion 33, extends from the base portion 33 in an opposite direction from that taken from the side portions 35—35. In final assembly of the parts, the contact portion is adapted to extend through the extruded opening 26 of the attaching member 13 for electrical engagement with the contacts 7 of the contact carrier part 6. A soldering terminal 40 is provided at one end of the body portion 32 comprising a portion 41 (Fig. 16) extending in substantially perpendicular relation to the base portion 33 adjacent one end thereof having wing portions 42—42 integral with the portion 41 at points spaced from the base 33 and bent to form a substantially tubular portion 43 (Fig. 21) for receiving bare wires 44 at an end of the wire conductor 5a whereby the conductor may be secured to the terminal 5 with the bare wires in electrical engagement with the terminal through dipping the tubular portion 43 into solder to dispose the solder around the tubular portion as at 45 (Figs. 16 and 20) or through spot-welding. As a result of the particular relationship of the soldering terminal 40 and the body portion 32, wherein the soldering terminal 40 extends in substantially perpendicular relation to the axis of the body portion 32, I am enabled to make an appreciable saving in space, when the wire terminal is finally assembled with an insulating panel, over the wire terminal of my above-mentioned application due to the fact that the walls of the switch frame, which, in the present case, comprises portions of the fastener member 8, may be brought substantially closer to the body of the wire terminals than is the case with the construction of the above-mentioned application wherein the soldering terminal projects substantially in the line of axis of the cover-engaging portion. By forming the soldering terminal 40 of substantially tubular shape, it is possible to maintain the bare wires of the conductor in temporary attachment with the terminal prior to the final soldering act.

Attachment of the attaching member 13 to the insulating panel 14 is preferably carried out in two steps. In the first step the arms 29—29 of the attaching member are moved through the rectangular openings 12 of the panel from a position opposite the inner face 24 of the panel, as shown in Fig. 12, until they project beyond the outer surface 34 of the panel a sufficient distance to receive the body portion 32 of the wire terminal. Next the body portion 32 of the wire terminal is moved toward the diverging portions 31—31 of the arms 29—29 with the contact portion 39 extending toward the panel, as most clearly shown in Fig. 15. As pressure is exerted on the wire terminal in the direction of the panel, the arms 29—29 expand enabling the wire terminal to be moved into final attached position relative to the panel with the contact portion 39 extending through the aperture 26 of the base 25. Contemporaneously with this action the arms 29—29 contract to dispose the shoulders 30—30 in final engagement with the body portion 32, as most clearly shown in Fig. 14, so as to maintain the terminal firmly in place with the contact portion 39 engaging a contact member 7 when the parts of the switch are in final assembly under the tension exerted by the spring shoulders 30—30 upon the body portion 32. At the same time, as a result of the relative dimensions of the terminal and the attaching member, engagement of the shoulders 30—30 with the body portion 32 effects a drawing action causing the outwardly-extending portions 28—28 of the legs 27 of the attaching member to be drawn tightly against the inner surface 24 of the panel whereby the parts are firmly assembled together. In my preferred form of attaching member 13 the arms 29—29 are spaced apart a distance slightly greater than the width of the aperture 12 of the panel through which they extend enabling them to engage resiliently the walls 24a (Figs 11 and 15) surrounding the aperture so as to hold the attaching member in the position shown in Figs. 11 and 15 prior to assembly of the wire terminal therewith with the base portion 25 of the attaching member positioned within the opening 12 (Fig. 16). It should be understood, however, that proper assembly of the parts of the device may be effected even though there is no cooperative fastener engagement of the arms 29—29 with the walls 24a of the aperture 12.

It will be noticed that when the wire terminal is finally assembled with the panel, the contact portion 39 extends through the extruded opening 26 of the base 25 to a position beyond the plane of the laterally-extending portions 28—28, as most clearly shown in Figs. 14 and 16, so as to contact the contact members 7. In order that the stationary part 2 may present a flat surface facing the contact carrier 6, I have provided a thin insulating panel 47 of slightly greater thickness than that of the laterally-extending portions 28—28 of the attaching member disposed adjacent the inner surface 24 of the panel 4 and providing openings 48 receiving the laterally-extending portions 28—28, as most clearly shown in Figs. 6 and 7.

The contact carrier part 6 has an insulating panel 49 having a rectangular portion 50 (Fig. 5) of the same width, but of greater length than the rectangular portion 9 of the insulating plate 4 and a reduced portion 51 (Fig. 5) at one end of the same width but shorter in length than the reduced portion 10 of the panel 4. The reduced portion 51 forms shoulders 52—52 adjacent the junction thereof with the rectangular portion 50. An opening 53 (Fig. 6) is formed in the rectangular portion 50 adjacent the reduced portion 51 for a purpose to be described. The shoulders 52—52 are in alignment with the shoulders 11—11 of the insulating plate 4 when the parts of the switch are in "off" position, as shown in Fig. 1, but are out of alignment when the parts are in "on" position, as shown in Fig. 2.

The insulating panel 49 carries spaced contact members 7—7 for electrical engagement with the contact portions 39 of the terminals 5 when the switch is in "on" position. Each of the contact terminals 7, in my preferred form, comprises a base portion or contact portion 54 disposed adjacent the inner surface 55 of the panel 49 (Figs. 6 and 8). A pair of spaced yieldable arms 56—56 extend in angular relation to the base portion 54 of each of the contact members 7—7 through apertures 57 (Fig. 8) in the panel 49 to a position beyond the outer surface 58 of the panel to receive in detachable fastener engagement the metal ends 59 of a fuse 60. Each of the pairs of arms 56—56 has inwardly-extending shoulder portions 61—61 (Fig. 8) whereby the fuse is maintained in assembly with the contact carrier part between the shoulders and the outer surface 58 of the panel. Relative dimensions of the contact members 7—7 and the ends 59 of the fuse serve to draw the base portions 50 of the contact members adjacent the inner surface 55 of the panel 49 upon cooperative fastener engagement of the shoulders 61—61 with the ends of the fuse, as will be understood by those skilled in the art. In order that the contact carrier part 6 may present a flat surface facing the stationary part 2, I have provided a thin insulating panel 62 preferably having the shape of the panel 49. The insulating panel 62 is disposed adjacent the inner surface 55 of the panel 49 and has openings 63 receiving the base portions 54 of the contact members 7—7 (Fig. 8).

As a means for maintaining the contact carrier part 6 and the stationary part 2 in assembled operative relation, whereby the contact carrier part may be moved in reciprocable relation to the stationary part for turning the switch on and off, I have provided a sheet metal clip-like retainer or fastener member 8. The fastener member 8 is preferably formed of one-piece sheet metal and comprises an end portion or base portion 64 and spaced spring legs 65—65 extending in substantially perpendicular relation to the base portion 64. Each of the legs 65—65 has laterally-extending flange portions 66—66 at opposite edges thereof whereby the legs have a substantially channel-shaped cross-section. When the parts of my switch are finally assembled together, the panels 4 and 49 are disposed within the channel-shaped legs with the flanges of each leg engaging the outer surface 34 of the panel 4 and the outer surface 58 of the panel 49 (Fig. 8) thus maintaining the contact and stationary parts in proper facing relation, but at the same time permitting reciprocable movement of the contact carrier part relative to the stationary part. Inwardly-extending shoulders 67 are provided at the ends of the legs 65 away from the base 64 adapted to be disposed behind the shoulders 52—52 of the panel 49, thus securing the fastener member 8 in assembly with the parts.

The fastener member 8 is assembled with the contact carrier part and stationary part by first disposing the opposite ends of the insulating plates from the reduced portions within the channel-shaped legs 65—65. Engagement of the shoulders 67—67 of the legs with the edges of the insulating plates expand the legs against the natural spring tension thereof. Then the insulating plates and fastener member are moved relative to each other to pass the shoulders of the insulating plates by the shoulders 67—67 of the legs, at which time the legs contract to dispose the shoulders 67 of the legs behind the shoulders 52—52 of the panel 49. Thus it will be seen that, as a result of the relative dimensions of the insulating panels 49 and 4, the shoulders 67—67 engage behind the shoulders 52—52 of the panel 49 of the contact carrier part in all relative positions of the contact carrier part and the stationary part. When the parts of the switch are in "off" position, as shown in Fig. 1, the shoulders 67—67 also engage behind the shoulders 11—11 of the insulating panel 4 limiting reciprocable movement of the contact carrier part relative to the stationary part in a direction away from the supporting panel 1. Movement of the contact carrier part toward the support, as in closing the circuit, is limited by the base 16 of the nut member which abuts the insulating panel 49 when the contact terminals 7—7 are in electrical contact with the terminals 5—5, as shown in Fig. 6.

The operating shaft 20, in my preferred form, as most clearly shown in Figs. 6 and 6a, comprises a base portion 68 having spaced integral side portions 69 extending outwardly from the base portion and toward each other at their edges away from the base portion forming a tubular portion which comprises a substantial part of the length of the shaft. Lug portions 70 extend from the base portion 68 adjacent one end of the shaft in substantially upstanding parallel relation. The lug portions 70 are adapted to be extended into the opening 53 of the insulating panel 49 when the shaft is in assembly with the contact carrier part and an opening 71 is provided in the shaft intermediate the lug portions 70 and the tubular body portion for receiving a portion 72 of the insulating panel 49 intermediate the opening 53 and the end of the panel, as shown in Fig. 6. Thus longitudinal movement of the operating shaft relative to the panel 6 is limited by the aforesaid cooperative engagement of the lugs 70—70 of the shaft within the opening 53 of the panel and the portion 72 of the panel within the opening 71 of the shaft. Lateral movement of the shaft relative to the panel 6 is prevented by the bearing 18 of the threaded member 3 which receives the operating shaft within its bore 19 and maintains the shaft in substantially parallel relation to the panel 6 in all positions of the contact carrier part relative to the stationary part. Thus it will be seen that by my invention the operating shaft is assembled with the insulating panel 6 without the use of tools simply by entering the lug portions 70—70 within the opening 53 of the panel and holding the same therein until the shaft is extended into the bearing of the nut member 3.

Although I have illustrated and described preferred forms of my invention, I do not wish to be limited thereby because the scope of my invention is best defined by the following claims.

I claim:

1. A switch of the class described comprising a stationary part including an insulating plate carrying contact means, a contact carrier part mounted for reciprocable movement relative to said stationary part, said carrier part including an insulating plate carrying contact means for electrical engagement with said contact means of said stationary part at predetermined relative positions of said parts, and a fastener member for maintaining said parts in assembled operative relation, said fastener member being of U-shaped formation having a base at one end and spaced parallel channeled arms extending from said base, said insulating plates being received within said channeled arms whereby said arms maintain said plates in assembled relation, said fastener being secured to said carrier part and movable with said carrier part in respect to said stationary part.

2. A switch of the class described comprising a stationary part including an insulating plate carrying contact means, a contact carrier part mounted for reciprocable movement relative to said stationary part, said carrier part including an insulating plate carrying contact means for electrical engagement with said contact means of said stationary part at predetermined relative positions of said parts, and a fastener member for maintaining said parts in assembled operative relation, said fastener member being of U-shaped formation having a base at one end and spaced parallel channeled arms extending from said base, said insulating plates being received within said channeled arms whereby said arms maintain said plates in assembled relation, said arms of said fastener being yieldable and said insulating plate of said carrier part and said arms having cooperating fastener means whereby said fastener member is secured to said carrier part, and said fastener member being movable with said carrier part in respect to said stationary part.

3. A switch of the class described comprising a stationary part including an insulating plate carrying contact means, a contact carrier part mounted for reciprocable movement relative to said stationary part, said carrier part including an insulating plate having shoulder means, said insulating plate carrying contact means for electrical engagement with said contact means of said stationary part at predetermined relative positions of said parts, and a fastener member for maintaining said parts in assembled operative relation, said fastener member being in the form of a relatively large U-shaped clip having a base at one end and spaced parallel spring arms extending from said base, said arms being of channel-shaped cross-section and said plates being received within said channels, said arms having inwardly-extending shoulders in cooperative fastener engagement with said shoulders of said insulating plate of said carrier part whereby said fastener is secured to said carrier part and said fastener member being movable with said carrier part in respect to said stationary part.

HOWARD J. MURPHY.